US010145530B2

(12) United States Patent
Willeke

(10) Patent No.: US 10,145,530 B2
(45) Date of Patent: Dec. 4, 2018

(54) ARRANGEMENT OF A HEATSINK IN A HEADLAMP

(71) Applicant: Hella KGaA Hueck & Co., Lippstadt (DE)

(72) Inventor: Franz-Georg Willeke, Anröchte (DE)

(73) Assignee: Hella GmbH & Co., KGaA, Lippstadt (DE)

( * ) Notice: Subject to any disclaimer, the term of this patent is extended or adjusted under 35 U.S.C. 154(b) by 107 days.

(21) Appl. No.: 14/743,595

(22) Filed: Jun. 18, 2015

(65) Prior Publication Data

US 2015/0377448 A1 Dec. 31, 2015

(30) Foreign Application Priority Data

Jun. 30, 2014 (DE) ........................ 10 2014 109 114

(51) Int. Cl.

| | |
|---|---|
| ***F21S 8/10*** | (2006.01) |
| ***F21V 21/00*** | (2006.01) |
| ***B60Q 1/00*** | (2006.01) |
| ***B60Q 3/00*** | (2017.01) |
| ***F21V 11/00*** | (2015.01) |
| ***F21V 15/01*** | (2006.01) |
| ***F21V 7/04*** | (2006.01) |
| ***B60Q 1/06*** | (2006.01) |
| ***F21V 29/00*** | (2015.01) |
| ***F21S 45/47*** | (2018.01) |
| ***F21S 43/19*** | (2018.01) |

(Continued)

(52) U.S. Cl.

CPC ............... *F21S 45/47* (2018.01); *F21S 43/14* (2018.01); *F21S 43/19* (2018.01); *F21S 43/237* (2018.01); *F21S 43/247* (2018.01); *F21S 43/27* (2018.01); *F21S 45/49* (2018.01)

(58) Field of Classification Search

CPC ...... F21S 48/328; F21S 48/321; F21S 48/211; F21S 48/2237; F21S 48/2287; F21S 48/2206; F21S 48/215; F21S 45/47; F21S 45/49; F21S 43/247; F21S 43/27; F21S 43/14; F21S 43/19; F21S 43/237

See application file for complete search history.

(56) References Cited

U.S. PATENT DOCUMENTS 9,267,659 B2 * 2/2016 Lee ......................... F21S 48/32
2005/0201098 A1 * 9/2005 Dipenti .................... B60Q 3/06 362/294

(Continued)

FOREIGN PATENT DOCUMENTS

DE 102011051047 A1 12/2012
DE 102012103631 A1 10/2013

OTHER PUBLICATIONS

"Definition of Cantilevered", accessed at https://www.merriam-webster.com/dictionary/cantilevered on Feb. 2, 2018.*

*Primary Examiner* — Erin Kryukova
(74) *Attorney, Agent, or Firm* — Husch Blackwell LLP

(57) ABSTRACT

An arrangement of a heatsink for insertion in a headlamp, and a holder being provided in the headlamp, in which the heatsink is held. At least one semiconductor light source is provided, which can be cooled with the heatsink (10). A clamping element is provided, with which the heatsink is arranged in a holding manner on the holder and by means of which one or more semiconductor light sources are directly or indirectly held on the heatsink.

11 Claims, 1 Drawing Sheet

(51) Int. Cl.

| | |
|---|---|
| ***F21S 43/14*** | (2018.01) |
| ***F21S 43/27*** | (2018.01) |
| ***F21S 43/237*** | (2018.01) |
| ***F21S 43/247*** | (2018.01) |
| ***F21S 45/49*** | (2018.01) |

(56) References Cited

U.S. PATENT DOCUMENTS

2005/0270794 A1* 12/2005 Okamoto ............... F21S 48/211 362/555
2006/0044840 A1* 3/2006 Watanabe ............ F21S 48/1109 362/647
2008/0225541 A1* 9/2008 Ishida .................. F21S 48/1159 362/516
2009/0154180 A1* 6/2009 Cho ..................... F21S 48/1159 362/459
2009/0207617 A1* 8/2009 Merchant .................. F21K 9/00 362/294
2010/0025721 A1* 2/2010 Sakai ........................ F21K 9/00 257/99
2011/0051446 A1* 3/2011 Saito ......................... F21K 9/00 362/509
2011/0058387 A1* 3/2011 Matsunaga ............... F21K 9/00 362/547
2013/0250602 A1* 9/2013 Tsukamoto .......... F21S 48/1109 362/547
2013/0329443 A1* 12/2013 Yasuda ................... F21S 48/10 362/516
2014/0376232 A1* 12/2014 Behr .................... F21S 48/1104 362/294

* cited by examiner

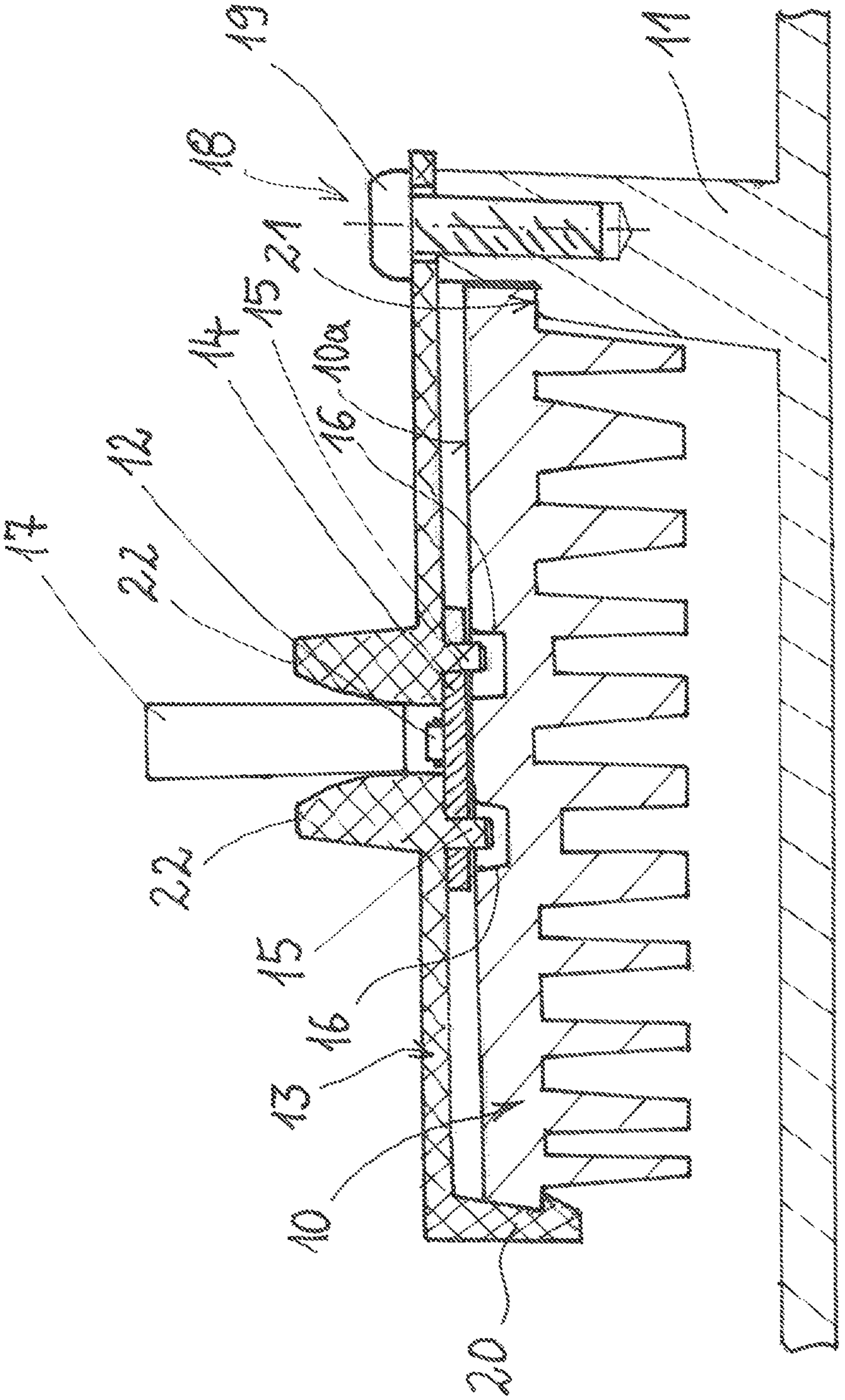
19
18
11
21
15
14
10a
16
12
22
17
22
15
16
13
10
20

ARRANGEMENT OF A HEATSINK IN A HEADLAMP

CROSS REFERENCE

This application claims priority to German Application No. 10 2014 109114.0, filed Jun. 30, 2014, the entirety of which is hereby incorporated by reference.

FIELD OF TECHNOLOGY

The present invention relates to an arrangement of a heatsink for insertion in a headlamp, a holder being provided in the headlamp, in which the heatsink is held and wherein at least one semiconductor light source is provided, with which the heatsink can be cooled, Such arrangements of a heatsink for insertion in a headlamp form so-called light-modules, and the holder can for example form the housing of the headlamp or a carrier frame, on which the heatsink is supported. By this means, the heatsink can for example be arranged rigidly in the housing of the headlamp. The semiconductor light source comprises for example one or several LEDs and for constant operation, the semiconductor light source must often be cooled, the cooling being executed with the heatsink. Herein, the semiconductor light source is either supported directly or via a carrier PCB on the heatsink, and usually the heatsink has machined surfaces for the arrangement on the holder and/or for holding the semiconductor light source, which makes the provision of a heatsink correspondingly more expensive.

BACKGROUND

EP 2 378 323 A2 shows, for example, a heatsink having several functional surfaces, whose manufacture requires milling/cutting. Furthermore, the heatsink has bores, and for the manufacture of the milled or drilled structural characteristics of the heatsink, tool inserts and production steps are required which make the heatsink more expensive. Especially whenever the heatsink is manufactured by means of a pressure die-casting process or a metal extrusion process, the advantages of a finished contour of the heatsink can only be used conditionally, as a respective further, chip-producing treatment is required for the provision of the heatsink.

SUMMARY OF THE INVENTION

The problem of the invention is the arrangement of a heatsink in a headlamp, which is executed as simple as possible and wherein the heatsink design is free from surfaces produced by means of chip-producing processes The invention includes the technical teaching that a clamping element is provided, with which the heatsink is arranged in a holding manner on the holder and by means of which one or more semiconductor light sources are directly or indirectly held on the heatsink.

Herein, the clamping element according to the invention covers two tasks. First, the heatsink is held on the holder by the clamping element, and second, the semiconductor light source is directly or indirectly held on the heatsink. The arrangement of the semiconductor light source in the sense of the present invention does not require an immediate body contact between the semiconductor light source and the heatsink, an indirect arrangement, for example via a carrier PCB is also possible. Decisive for the use of the advantages according to the invention is, however, that the clamping element holds the heatsink in an elastically prestressed manner on the holder and/or one or more semiconductor light sources on the heatsink. The clamping element may, of course, comprise several parts and may for example comprise a spring element.

By using a clamping element according to the invention, the advantage is achieved that the heatsink is embodied free from machined surfaces and that the heatsink can be manufactured in a simple manner by means of an impact extrusion process, an extrusion process or a pressure die-casting process. If the heatsink is manufactured by means of an impact extrusion process, for example by means of aluminum die-cast or a pressure die-cast or a normal die-cast of alternative, equally suitable materials for the provision of a heatsink, it may then be immediately introduced, e.g. directly or e.g. after a following surface treatment to the arrangement according to the invention. Due to the use of the clamping element, no surfaces or holes requiring cutting or drilling are necessary on the heatsink, as the clamping element serves for the fastening of the heatsink on the holder or for the fastening of the semiconductor light source on the heatsink and as e.g. screws or other elements are not needed.

In addition to the possibility of making a heatsink e.g. from a die-cast part, the fastening according to the invention can also be used for a heatsink being made from a sheet metal part or from a combination of different manufacturing processes.

A heatsink which is for example manufactured in an extrusion process, may also be free from surfaces which have been machined in a chip-producing manner. A saw cut may, however, be necessary to separate the heatsink from a large extruded workpiece. In the sense of the present invention, therefore, a surface which is free from chip-producing machining, refers to processes such as cutting, drilling and such like, to achieve the immediate fastening of the heatsink on the holder or the fastening of the semiconductor light source on the heatsink.

According to an advantageous embodiment for the arrangement of the semiconductor light source, a carrier PCB may be provided, on which the semiconductor light source is supported, wherein the carrier PCB is arranged between the clamping element and a cooling side of the heatsink. When the clamping element clamps the semiconductor light source against the heatsink, the carrier PCB may be in the force flow between the semiconductor light source and the cooling side of the heatsink. The clamping element may for example be embodied and prestressed so that it presses the carrier PCB with direct contact onto the cooling side of the heatsink without the force flow being led through the semiconductor light source itself. To this end, the clamping element may have an opening through which the semiconductor light source can emit light, for example into a light guide element.

According to a further advantage, the clamping element may have centering bosses by means of which the carrier PCB is held in its position on the heatsink. The centering bosses may for example be arranged on the side of the clamping elements facing the cooling side of the heatsink, and the centering bosses, for example in a double arrangement, run through bores in the carrier-PCB and fit in those. The heatsink may have recesses corresponding with the positions of the centering bosses so that the mechanical tension of the clamping element is applied via the carrier PCB to the cooling side of the heatsink. Herein the centering bosses may protrude into the recesses, the recesses themselves having already been produced in the extrusion process or in the impact extrusion process. In an exemplary embodiment, the recesses may be formed as round or rectangular indentations, if the heatsink is manufactured by means of the impact extrusion process, and if the heatsink is manufactured by means of an extrusion process, the recesses may be executed as a continuous longitudinal groove.

According to a further advantageous embodiment of the arrangement according to the invention, it may comprise a light guide element being held in position for the semiconductor light source. On the clamping element, for example, holding shapes can be molded-on, which limit the opening through which the semiconductor light source emits the light; and if the light guide element is arranged in the opening in the clamping element, the light guide element can be held in its position by the molded-on holding shape. Herein, the clamping element has a further function, as by means of the clamping element, the light guide element is held in its position above the semiconductor light source.

According to a further advantageous embodiment of the clamping element according to the invention, it can have a plane extension, beyond which, for example, the centering bosses and/or molded-on holding shapes extend. In particular the clamping element can be fastened to the holder by means of at least one fastening element, preferably executed as a screw-fastening element. By means of this fastening to the holder, the heatsink can be clamped-on at the same time, and the clamping element can, for example, be made from a metal or a plastic material. The clamping element can particularly comprise at least one snap-fastening hook, with which the heatsink is at least partially held. The snap-fastening hook can for example clasp the edge of the heatsink Furthermore, the heatsink can be tightened with the pretensioned clamping element against a clamping edge on the holder, while the tension is deflected through the carrier PCB into the heatsink. The fastening element can therefore serve to arrange the clamping element and therefore also the heatsink on the holder, and at the same time the fastening element applies the pretension to the clamping element. The geometric dimensions between the clamping element, the heatsink and the holder can be embodied so advantageously relative to one another, that by fastening the screw-fastening element the pretension is applied to the clamping element, and the heatsink is fastened on one hand by the snap-fastening hook and on the other hand for example on an opposite side on the clamping edge of the holder.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 1 is a cross-sectional lateral view of the arrangement of a heatsink according to the present invention.

DETAILED DESCRIPTION OF THE DRAWINGS

The FIGURE shows an arrangement of a heatsink 10, as it can for example be inserted in a headlamp, while forming a light module. The arrangement is shown arranged on a holder 11, wherein the holder 11 can for example form the housing of the headlamp, which does not have to be encompassed by the arrangement.

The arrangement has a semiconductor light source 12, which is represented exemplarily as a SMD-LED. The semiconductor light source 12 can radiate into a light guide element 17 during operation, to fulfil, for example, a light signal function in a vehicle headlamp. Herein, the semiconductor light source 12 is cooled via the heatsink 10, the cooling being achieved by means of and/or through a carrier PCB 14, on which the semiconductor light source 12 is held. The carrier PCB 14 can for example comprise a respective metal portion or provide a high thermal conductivity by another means.

The heatsink 10 is held by a clamping element 13, and the clamping element 13 is made from a plastic material, for example by means of an injection molding process. The clamping element 13 has a plane extension and covers essentially a cooling side 10*a* of the heatsink 10. In the position of the semiconductor light source 12 on the cooling side 10*a* of the heatsink 10, the clamping element 13 has an opening in which a light guide element 17 is received, so that during operation of the semiconductor light source 12, emitted light is radiated into the light guide element 17.

The clamping element 13 is held on the holder 11 via a fastening element 18, which is for example executed as a screw-fastening element 19. On the side opposite the fastening element 18 on the holder, the clamping element 13 has a snap-fastening hook 20 which clasps a longitudinal edge of the heatsink. On the side of the fastening element 18, the heatsink 10 sits on a clamping edge 21 on the holder 11, and by tensing the clamping element 13 by means of the fastening element 18 a tension is created in the clamping element 13. This tensioning results in the pressing of the carrier PCB 14 with the semiconductor light source 12 onto the cooling side 10*a* of the heatsink 10. At the same time, the heatsink 10 is held on the holder 11 by the clamping element and the heatsink 10 is pressed against the clamping edge 21. Therefore, the clamping element fulfils the function of a seat for the heatsink 10 on the holder 11, and the clamping element fulfils the function of the arrangement of the semiconductor light source 12 on the cooling side 10*a* of the heatsink.

In order to position the light guide element 17 above the semiconductor light source 12 in a holding manner according to a further function of the clamping element 13, the clamping element 13 has molded-on holding shapes 22, between which the light guide element 17 is held, and the molded-on holding shapes 22 limit for example the opening in the clamping element 13. In a manner not shown in detail, the light guide element 17 can for example be snap-fastened to the clamping element 13 and particularly to the molded-on holding shapes 22.

Furthermore, the clamping element 13 has centering bosses 15, which are positioned on the side of the clamping elements 13 on which the carrier PCB 14 is arranged and which faces in the direction of the cooling side 10*a* of the heatsink 10. The centering bosses 15 penetrate the carrier PCB 14 through the added bores, so that the carrier PCB 14 is held in its position and the semiconductor light source 12, which is for example fastened on the carrier PCB 14 in a conventional manner, is held in the opening in the clamping element 13.

According to the shown embodiment, the heatsink 10 can be embodied free from surfaces which have been machined with chip-producing processes. Except from this embodiment of the heatsink 10 is a surface of the heatsink 10, which is formed by means of a saw cut, for example to cut the heatsink 10 from an extruded profile.

In an exemplary embodiment, the heat sink 10 has not screw bores or other surfaces machined with chip-producing processes, particularly due to the fastening method with the clamping element 13, and also in the position, in which the carrier PCB 14 is arranged on the cooling side 10*a* of the heatsink 10, there are no surface treatments with chip-producing processes necessary. The surface which can be produced by means of an extrusion process or an impact extrusion process, for example when the heatsink 10 is made from aluminum, can be sufficient to achieve a face-to-face cooling contact for example with the carrier PCB 14. In order for the centering bosses 15 not to sit on the cooling side 10*a* of the heatsink 10 and weaken the tensioning of the carrier PCB 14, the cooling side 10*a* has recesses 16 which can also be already produced by means of an extrusion process or impact extrusion process. The recesses 16 merely show in an exemplary embodiment, that the heatsink 10*a* can have respective contours which are for example necessary for a carrier PCB 14, despite missing chip-producing processes.

The clasping of the clamping element 13 around the outer edge of the heatsink 10 is merely shown in an exemplary embodiment with the snap-fastening hook 20. Exemplarily, the lateral side of the heatsink 10 can be profiled accordingly, and achieve a form-fit also in a different manner, particularly with the clamping element 13, but also with the holder 11.

In its execution, the invention does not relate solely to the preferred design example described above. On the contrary, a number of variants that use the solution as represented above are conceivable, even on designs that are fundamentally different. All characteristics resulting from the claims, the description or the drawings and/or advantages, including design details, arrangements in space and process steps can be essential for the invention on their own as well as in any combination.

LIST OF REFERENCE SIGNS

10 Heat sink
10*a* Cooling side of heatsink
11 Holder
12 Semiconductor light source
13 Clamping element
14 Carrier PCB
15 Centering boss
16 Recess
17 light guide element
18 Fastening element
19 Screw-fastening element
20 Snap-fastening hook
21 Clamping edge
22 molded-on holding shape

The invention claimed is:

1. A heatsink arrangement for a headlamp, the heatsink arrangement comprising:

a heatsink associated with one or more semiconductor light sources for cooling thereof, the heatsink including each of an upper portion facing the one or more semiconductor light sources and a lower portion and a proximal end portion and a distal end portion;

a holder provided in the headlamp, said holder extending outwardly from a surface within the headlamp;

a clamping element comprising each of a first end portion and a second end portion, said clamping element supporting the heatsink at the upper portion of the heatsink such that the first end portion of the clamping element supports the distal end portion of the heatsink and the second end portion of the clamping element supports the proximal end portion of the heat sink and the distal end portion and the proximal end portion of the heatsink are supported between the first end portion and the second end portion of the clamping element, and supporting the one or more semiconductor light sources, both the heatsink and the one or more semiconductor light sources being supported outwardly from the surface within the headlamp;

wherein the clamping element and the holder are directly fastened to one another only at the second end portion of the clamping element; and wherein the first end portion of the clamping element and the holder are not directly fastened to one another, and thereby the heatsink and the one or more semiconductor light sources are cantilevered such that a gap is provided between the lower portion of the heatsink and the surface within the headlamp at the first end portion of the clamping element, such that the lower portion of the heatsink is exposed to ambient air.

2. The heatsink arrangement according to claim 1, wherein the clamping element holds, in an elastic manner, at least one of the heatsink on the holder and one or more semiconductor light sources on the heatsink.

3. The heatsink arrangement according to claim 1 wherein the heatsink is at least one of the following:

embodied free from machined surfaces;

manufactured by means of an impact extrusion process, an extrusion process or a pressure die-casting process;

at least partially embodied by means of a sheet metal part.

4. The heatsink arrangement according to claim 1 wherein a carrier PCB is provided, on which the one or more semiconductor light sources is supported, wherein the carrier PCB is arranged between the clamping element and a cooling side of the heatsink.

5. The heatsink arrangement according to claim 4 wherein the clamping element has centering bosses by means of which the carrier PCB is held in a position on the heatsink.

6. The heatsink arrangement according to claim 5 wherein the heatsink has recesses into which the centering bosses extend.

7. The heatsink arrangement according to claim 1 wherein a light guide element is provided, which is held in a position above the at least one semiconductor light source by the clamping element.

8. The heatsink arrangement according to claim 1 wherein the clamping element has a two-dimensional extension and is fastened to the holder by means of at least one fastening element.

9. The heatsink arrangement according to claim 1 wherein the clamping element is made from a metal material or from a plastic material, and has at least one snap-fastening hook with which the heatsink is at least partially held.

10. The heatsink arrangement according to claim 9, wherein the heatsink is braced against a clamping edge on the holder.

11. A heatsink arrangement for a headlamp, the heatsink arrangement comprising:

a heatsink associated with one or more semiconductor light sources for cooling thereof, the heatsink including each of an upper portion facing the one or more semiconductor light sources and a lower portion and a proximal end portion and a distal end portion;

a holder provided in the headlamp, said holder extending outwardly from a surface within the headlamp;

a clamping element comprising each of a first end portion and a second end portion, said clamping element supporting the heatsink at the upper portion of the heatsink such that the first end portion of the clamping element supports the distal end portion of the heatsink and the second end portion of the clamping element supports the proximal end portion of the heat sink and the distal end portion and the proximal end portion of the heatsink are supported between the first end portion and the second end portion of the clamping element, and supporting the one or more semiconductor light sources, both the heatsink and the one or more semiconductor light sources being supported outwardly from the surface within the headlamp and located entirely between the first end portion and the second end portion of the clamping element;

wherein the clamping element and the holder are directly fastened to one another only at the second end portion of the clamping element; and wherein the first end portion of the clamping element and the holder are not directly fastened to one another, and thereby the heatsink and the one or more semiconductor light sources are cantilevered such that a gap is provided between the lower portion of the heatsink and the surface within the headlamp at the first end portion of the clamping element, such that the lower portion of the heatsink is exposed to ambient air.

* * * * *